US011202454B2

(12) United States Patent
Leibell

(10) Patent No.: US 11,202,454 B2
(45) Date of Patent: Dec. 21, 2021

(54) SMOKER DEVICE

(71) Applicant: Keowee Smokers & Grill Accessories, LLC., Great Neck, NY (US)

(72) Inventor: David Leibell, Great Neck, NY (US)

( * ) Notice: Subject to any disclaimer, the term of this patent is extended or adjusted under 35 U.S.C. 154(b) by 0 days.

(21) Appl. No.: 17/264,494

(22) PCT Filed: Sep. 10, 2019

(86) PCT No.: PCT/US2019/050379
§ 371 (c)(1),
(2) Date: Jan. 29, 2021

(87) PCT Pub. No.: WO2020/091895
PCT Pub. Date: May 7, 2020

(65) Prior Publication Data
US 2021/0298319 A1    Sep. 30, 2021

Related U.S. Application Data

(60) Provisional application No. 62/752,257, filed on Oct. 29, 2018.

(51) Int. Cl.
*A23B 4/052* (2006.01)
*A47J 37/07* (2006.01)

(52) U.S. Cl.
CPC .......... *A23B 4/052* (2013.01); *A23B 4/0523* (2013.01); *A47J 37/0704* (2013.01); *A47J 37/0786* (2013.01); *A23V 2002/00* (2013.01)

(58) Field of Classification Search
CPC ........ A23B 4/044; A23B 4/052; A23B 4/0523

USPC .................................................... 99/482, 481
See application file for complete search history.

(56) References Cited

U.S. PATENT DOCUMENTS

| | | | |
|---|---|---|---|
| 2,851,941 A * | 9/1958 | Cogar | A47B 31/02 99/352 |
| 4,374,489 A | 2/1983 | Robbins | |
| 4,721,037 A | 1/1988 | Blosnich | |
| 4,869,163 A | 9/1989 | Haskins | |
| 4,962,696 A | 10/1990 | Gillis | |
| 5,528,984 A | 6/1996 | Saurwein | |
| 5,768,983 A | 6/1998 | Treiber | |
| 5,891,498 A | 4/1999 | Boehler | |
| 6,050,177 A * | 4/2000 | Lassig, Jr. | A47J 37/041 126/25 R |
| D585,702 S | 2/2009 | Borovicka | |
| 7,703,386 B1 | 4/2010 | Bourgeois | |

(Continued)

FOREIGN PATENT DOCUMENTS

KR        10-1073882        10/2011

*Primary Examiner* — Reginald Alexander

(57) ABSTRACT

A smoker device for an outdoor cooking unit comprises a top, a back, two sides, and a hinged front door, all of which are substantially solid, and together forming an interior chamber with an open bottom. The smoker device rests on a grilling surface of a cooking unit. A perforated chimney box is fixably mounted inside the interior chamber, with a removable chip box positioned at the bottom of the chimney box, and a hinged hatch at the top. Removable food racks and a vessel for liquids may also be present inside the interior chamber. An adjustable air damper allows air exchange between the interior chamber and ambient air. The device allows an existing outdoor cooking unit to convert to a multi-rack vertical smoker.

11 Claims, 5 Drawing Sheets

(56) References Cited

U.S. PATENT DOCUMENTS

| | | | |
|---|---|---|---|
| 7,703,389 B2 | 4/2010 | McLemore | |
| 8,720,322 B2 * | 5/2014 | West | A47J 37/0704 |
| | | | 99/340 |
| 8,893,704 B2 | 11/2014 | Foster | |
| 9,603,372 B2 | 3/2017 | Bader | |
| 9,635,978 B2 | 5/2017 | Measom | |
| 9,668,615 B2 | 6/2017 | Contarino | |
| 2003/0150336 A1 * | 8/2003 | Roescher | A23L 5/17 |
| | | | 99/340 |
| 2007/0131234 A1 | 6/2007 | Moore | |
| 2007/0256572 A1 | 11/2007 | Davis | |
| 2010/0218754 A1 | 9/2010 | Kuntz | |
| 2014/0007778 A1 * | 1/2014 | Marks | A47J 37/0704 |
| | | | 99/339 |
| 2014/0261015 A1 | 9/2014 | Nelson | |
| 2014/0261016 A1 | 9/2014 | Kaderli | |

* cited by examiner

SMOKER DEVICE

CROSS-REFERENCE TO RELATED APPLICATION

This application claims the benefit of PCT application PCT/US2019/050379 filed Sep. 10, 2019; which claims the benefit of U.S. Provisional Application No. 62/752,257, filed Oct. 29, 2018

FEDERALLY-SPONSORED RESEARCH

None

FIELD OF INVENTION

This present disclosure relates to a retrofit vertical smoker device and hybrid wood pellet grill converter that, regardless of brand, make, model or size, can be mounted on most barbecue grills and outdoor cooking stations. More specifically, this device is intended to fit most barbecue grills that employ liquid propane, natural gas, and electricity as their primary heat source.

BACKGROUND OF INVENTION

Smoker attachments and hybrid wood pellet grill converters allow barbecue grill owners to grill and smoke their food products simultaneously on a single outdoor cooking system. The addition of a smoker attachment and hybrid wood pellet grill converter increases the utility of conventional barbecue grills by providing grill owners with a plurality of cooking options that would not otherwise be available to them solely using a conventional liquid propane, natural gas, or flat top griddle grill.

Even though the demand for versatile outdoor cooking systems has increased over the last seventy years, there is no affordable option for simultaneously smoking, grilling and cooking food products on a single outdoor cooking system. Leaders in the grilling industry have attempted to address that need by developing multifunctional barbecue grills and barbecue grill attachments; however, many of their proposed inventions bear their own unique and significant disadvantages.

First, most smoker attachments and wood pellet grill converters remove moisture from the food products being cooked and smoked within them. None of the prior art granted to, among others, Bader (U.S. Pat. No. 9,603,372), Borovicka et al. (U.S. Pat. No. D5,857,025), Davis (US 20,070,256,572), Kaderli (US 2014,0261016), Nelson (US 2014,0261015), Robbins (U.S. Pat. No. 4,374,489) and Saurwein (U.S. Pat. No. 5,528,984), includes a component or option for an internal water source to disperse moisture throughout the smoking chamber. By including a water source in the smoking chamber, consistent levels of steam are generated through evaporation, which then distributes moisture throughout the entire unit.

Second, among the smoker attachments and wood pellet grill converters that have a moisture-generating component, most cannot be retrofitted to more than one barbecue grill brand, make, model or size at a time. The utility of the proposed inventions in the prior art granted to, among others, Blosnich (U.S. Pat. No. 4,721,037), Boehler (U.S. Pat. No. 5,891,498), Gillis (U.S. Pat. No. 4,962,696), Haskins (U.S. Pat. No. 4,869,163), Kuntz (US 20100218754) and Robbins is dependent on the fuel type, size, shape and surface area of the barbecue grills to which each invention is mounted, attached, or installed.

Third, most multi-rack smoker attachments require users to make significant alterations to their existing barbecue grills which, if not done carefully, may lead to personal injury or property damage. For instance, the prior art granted to Blosnich, Boehler and Gillis each require users to remove the lid of their barbecue grills so that their smoker attachments may be safely fastened and operated.

Fourth, many smoker attachments and wood pellet grill converters eliminate the user's ability to cook and flavor certain food products. For example, some smoker attachments, like those presented by Blosnich, Boehler, Haskins, and Gillis, prevent users from accessing the grates of their barbecue grills and, as a result, impede users from grilling and smoking food products simultaneously. Relatedly, those that do provide an option to grill and smoke food products simultaneously, like the inventions presented by Bader (U.S. Pat. No. 9,603,372), Measom et al. (U.S. Pat. No. 9,635,978), Robbins, and Kuntz, require consumers exclusively to use either wood chips or wood pellets, and thus restrict the type of wood that a user may employ. Furthermore, all of the multi-rack smoker attachments previously mentioned prevent users from "cold smoking"—which occurs when the internal smoking chamber of the smoker attachment does not exceed 90° F.—delicate food products (e.g., fish and cheeses), because they require a significant amount of heat to be generated by a barbecue grill to function correctly.

Fifth, because many smoker attachments do not contain a sealed enclosure or provide users with a practical means of adding wood chips and/or wood pellets to their smokers without disrupting the amount of air flow entering the unit, suffer from significant smoke and heat loss during the cooking process. For example, the prior art granted to each of Blosnich, Boehler, Gillis, and Haskins require users to open their units entirely, which, in turn, requires substantial effort to add either wood chips or wood pellets, and results in significant smoke and heat loss. Likewise, smoker attachment inserts, like those proposed by Bader, Borovicka et al., Davis, Kaderli, Nelson, and Saurwein, require users to open the lids both of their smoker attachment and of their barbecue grill, thus resulting in considerable smoke and heat loss when adding wood chips or wood pellets.

Sixth and finally, because many smoker attachments include a fully enclosed chamber with fixed components that are small, difficult to reach and, when mishandled, break easily, are fragile and difficult to clean. For example, Boehler's invention includes, among other things, an enclosed chamber with approximately ten small and unsupported vertical smoke baffles which, after being exposed to natural moisture from certain food products and extremely high temperatures, can degrade and break. And, according to Boehler, whose unit is fully enclosed rather than open-bottomed, a gasket could not be installed to retain smoke and heat within the unit as the gasket would unsustainably pressurize his multi-rack smoker attachment and make the unit unsafe and inoperable. Additionally, Robbins's invention includes, among other things, an electric powered heating element which, like most electric vertical smokers—similar to the prior art granted to McLemore et al. (U.S. Pat. No. 7,703,389)—are subject to malfunctions and shorter life expectancies than cooking apparatuses that are manufactured solely out of protected hard metals.

SUMMARY OF THE DISCLOSURE

In one embodiment, there is A smoker device, comprising: a smoker box having a top side, a first side, a second side, a back side which are all substantially solid; a door hingeably mounted to either the first side or the second side, forming the smoker box's front side; an interior chamber formed by the top side, the first side, the second side, the back side, the front side, the bottom of said chamber being open; a perforated chimney box with a first chimney side abutting an interior portion of the second side, a chimney top abutting an interior portion of the top side, a hatch with a hatch door positioned at the chimney top; and, a removable open-top chip box positioned at the chimney box's bottom, capable of receiving chips which are fed into the hatch.

In one embodiment, the smoker box is positioned with the open bottom over a cooking unit, the cooking unit including a heat source, a grill surface supporting the first side, the second side, the back side; the heat source causing chip smoke from chips in the chip box, the chip smoke entering the interior chamber and flavoring food positioned in the interior chamber.

In one embodiment food positioned in the interior chamber is simultaneously flavored by the chip smoke and cooked by the heat source.

In one embodiment the perforated chimney box tapers in cross-section from narrow at the chimney top to wider at the chimney box's bottom.

In one embodiment at least one vent is positioned on the second side, aligned with the chip box, the chip box including perforations its side that faces the at least one vent and on its bottom.

In one embodiment there is at least one horizontal food rack positioned in the interior chamber.

In one embodiment there is at least one vessel for liquid positioned in the interior chamber.

In one embodiment there is a gasket on the hinged door's interior perimeter.

In one embodiment the dimensions of the smoker box allow it to be supported on the cooking unit's grill surface without removal of the cooking unit's lid.

In one embodiment the chips in the chip box are ignited, chip smoke enters the interior chamber and flavors food positioned in the interior chamber, without the use of the cooking unit's heat source.

In one embodiment an air damper in included on the smoker box.

In one embodiment the smoker box has dimensions 23.25 inches in width, 20.00 inches in height, and 11.25 inches in depth.

BRIEF DESCRIPTION OF THE FIGURES

The accompanying drawings, which are incorporated herein and form part of the specification, illustrate several, but not all, embodiments and features of the smoker device. Other aspects of the present disclosure shall be more readily understood when studied in combination with the accompanying figures and the detailed descriptions of them. Neither the accompanying figures nor the detailed descriptions below should be considered limiting.

DETAILED DESCRIPTION

Figure 1:
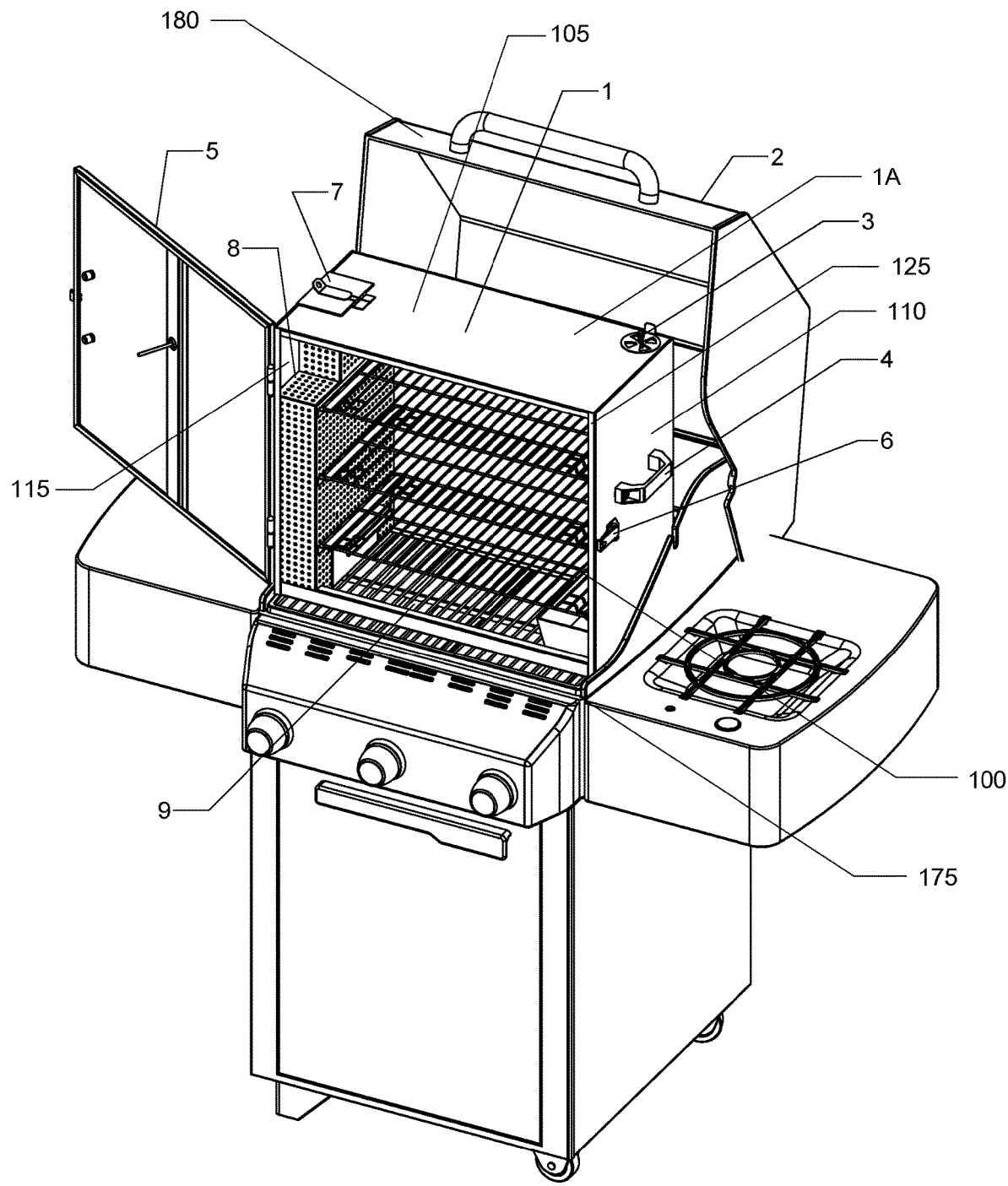
FIG. 1 is a top perspective view of the smoker device on a conventional cooking unit.

FIG. 1 shows a top perspective view of the smoker device 1 on a conventional cooking unit 2. The smoker box 1a includes a top side 105, a first side 110, a second side 115, a back side 120, and a door 5, of which all sides are substantially solid, but may include openings for a damper, a hatch, etc., as will be explained. Door 5 forms the front side of box 1a, and is hingeably mounted to either first side 110 or second side 115. These five sides form an interior chamber 100 with an open bottom 9. The smoker device 1 may be mounted on cooking units included but not limited to those configured for liquid propane, natural gas, or electricity, or on a flat top griddle grill. Smoker device 1 rest on a grill surface 175. Overall smoker device 1 is preferably built entirely out of metals, such as, but not limited to, stainless steel, carbon steel or aluminum.

FIG. 1 also shows heat resistant handles 4 on each side of the smoker device 1, a hatch door 7, an adjustable latch 6, a perforated chimney box 8, and an adjustable air damper 3. The front door 5 allows food products to be placed easily into and taken out of the smoker device. Additionally, the edges of top side 105, first side 110, second side 115, and of front door 5 may each be folded 90° to meet each other when the door 5 is closed, which increases the structural strength and integrity of the smoker device and, when the front door 5 is closed, helps to prevent unwanted gaps. A flame-retardant gasket 125 may be mounted around door 5's interior perimeter; alternately, gasket 125 may be mounted to the edges of first side 110, second side 115, and top side 105 that face door 5.

Figure 5:
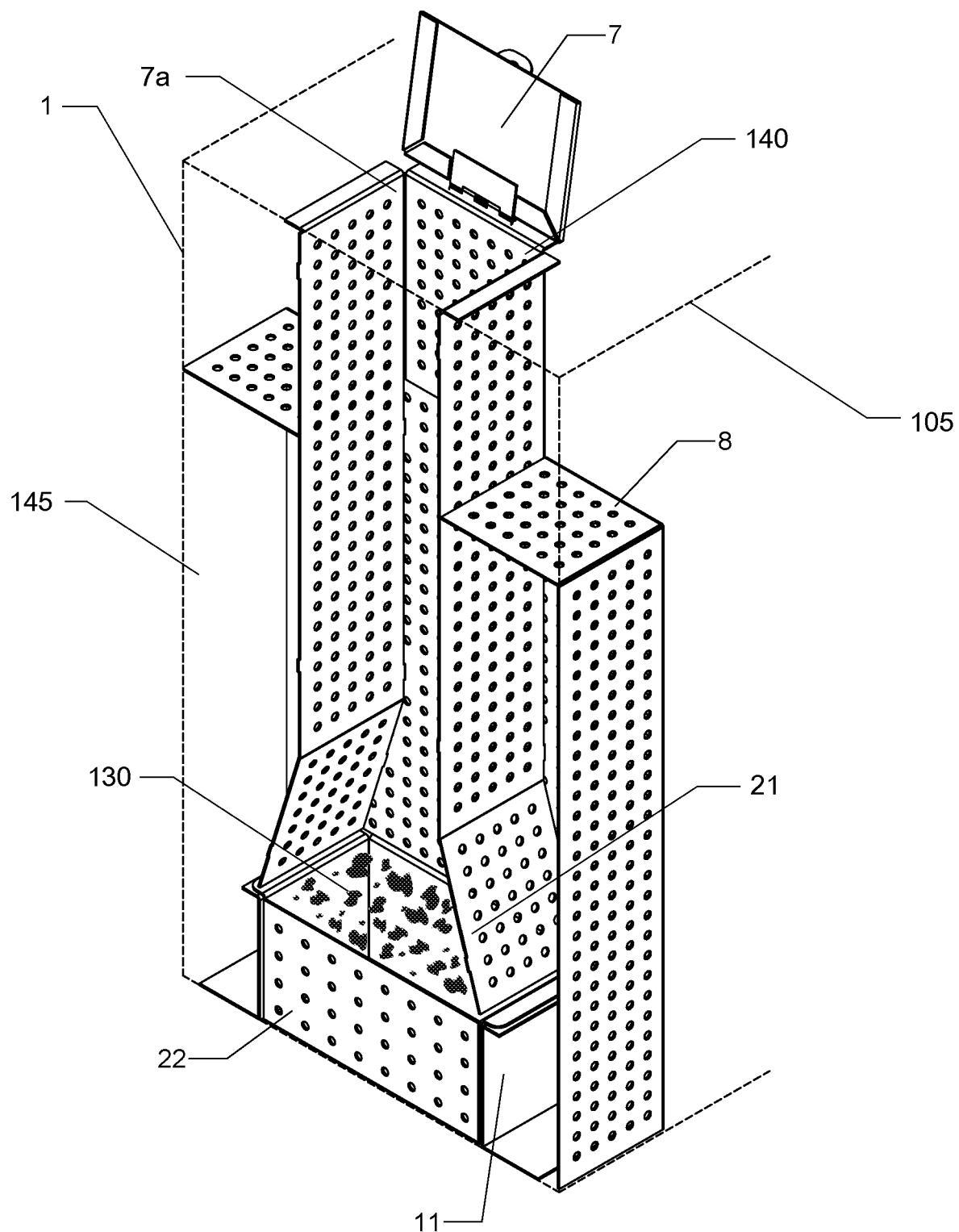
FIG. 5 is a close-up top perspective view of the chimney box and its components.

Hatch door 7 is preferably hinged and spring-loaded, and allows users to place chips 130 or wood pellets into the unit. Wood chips and wood pellets are referred to interchangeably as simply chips in this disclosure. The hatch door 7 is located directly above chimney box 8, the components of which are depicted in FIG. 5. The perforations in the chimney box 8 allow ample amount of air and smoke to flow freely throughout the smoker device 1. During operation, the adjustable air damper 3 helps allow users to obtain cross ventilation, temperature control and smoke density inside the smoker device.

Figure 2:
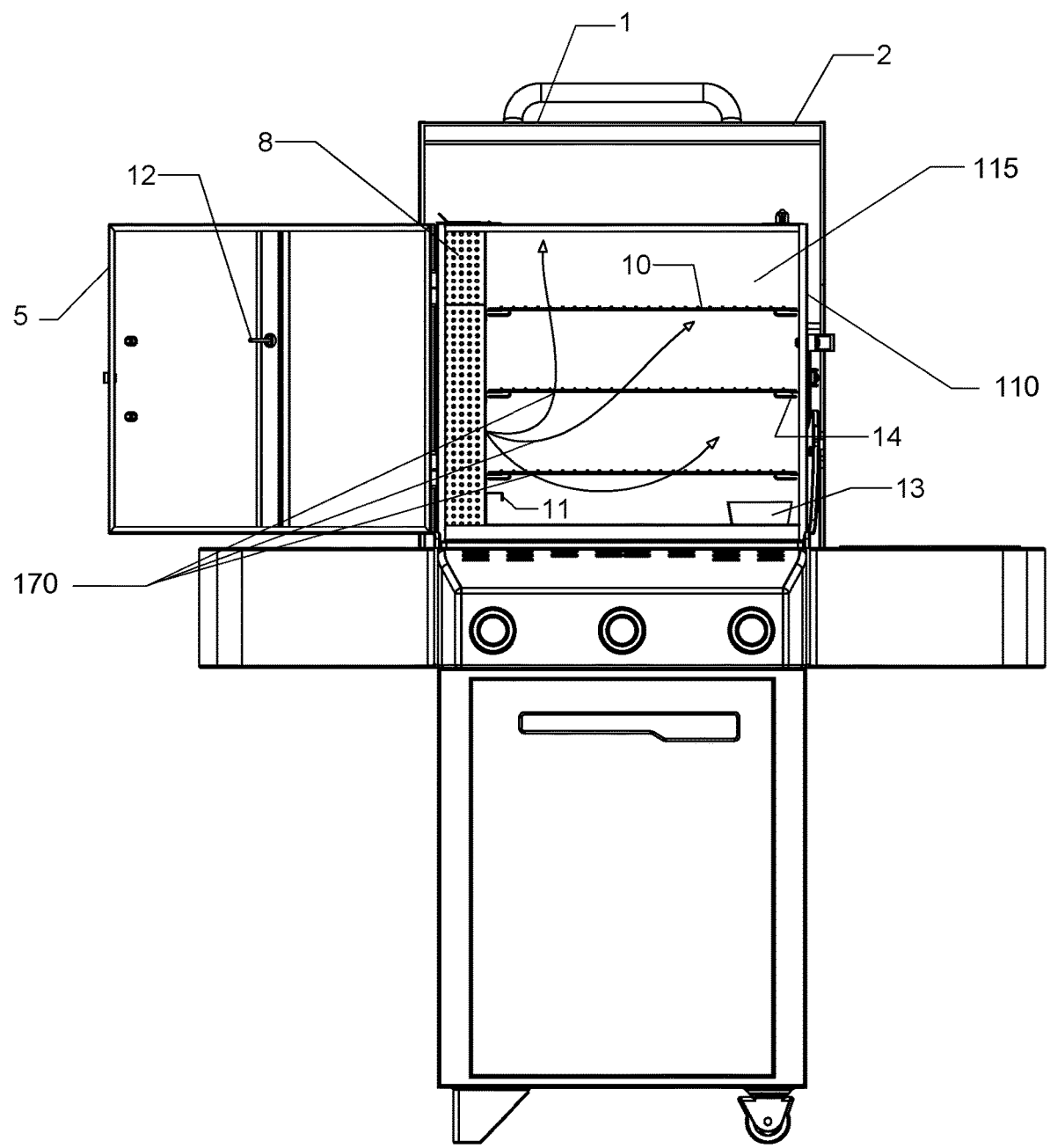
FIG. 2 is a front view of the smoker device retrofit onto a conventional cooking unit with a removable vessel for a liquid bowl therein.

FIG. 2 shows a front view of the smoker device 1 on a cooking unit 2. The smoker device 1 fits onto varying sizes of grills, which have a heat source, fueled by liquid propane, natural gas, electricity, or other fuels. The size of each barbecue grill is determined by, among other things, the number of its burners. The smoker device 1 fits onto, and may be compatible with cooking units with at least one burner. To ensure that the smoker device 1 will fit on a variety of liquid propane, natural gas, electric, and flat top griddle grills, the device may be made in multiple sizes based on the number of burners installed on standard barbecue grills. Preferably the sizes of the smoker device 1 does not require the lid 180 of cooking unit 2 to be removed.

FIG. 2 also shows chip smoke 170, as indicated by the three arrows, emanating from the chimney box 8 and the removable, open-top chip box (with handle, as described below in connection with FIG. 5) 11. Chimney box 8 is fixably attached to either the inside of the left wall or to the top of the smoker device 1, or to both. Each side of the chimney box 8 is perforated to allow sufficient amounts of air and smoke to flow freely throughout the unit. The bottom of chimney box 8 includes an open section to receive chip box 11 and for the latter to be removably fastened and installed. The detachable perforated chip box 11 has four (4) sides, one of which is perforated, and a perforated bottom. Both the chimney box 8 and the chip box 11 are preferably built out of hard metals, such as, but not limited to, stainless steel, carbon steel or aluminum. Their additional functionality will later be illustrated and described in FIG. 5. Smoker device 1 also has a series of rack supports 14 that are fixed to, and protrude internally from both chimney box 8 and first side 110. Rack supports 14 are configured securely to hold food racks 10 on a horizontal level plane. FIG. 2 depicts a removable vessel for liquid 13 that, because the unit has an open bottom (9 depicted in FIG. 1), may be placed directly on the barbecue grill grates. Also depicted in FIG. 2 is the rear of the temperature gauge 12, which is attached to the center of the front door 5.

Figure 3:
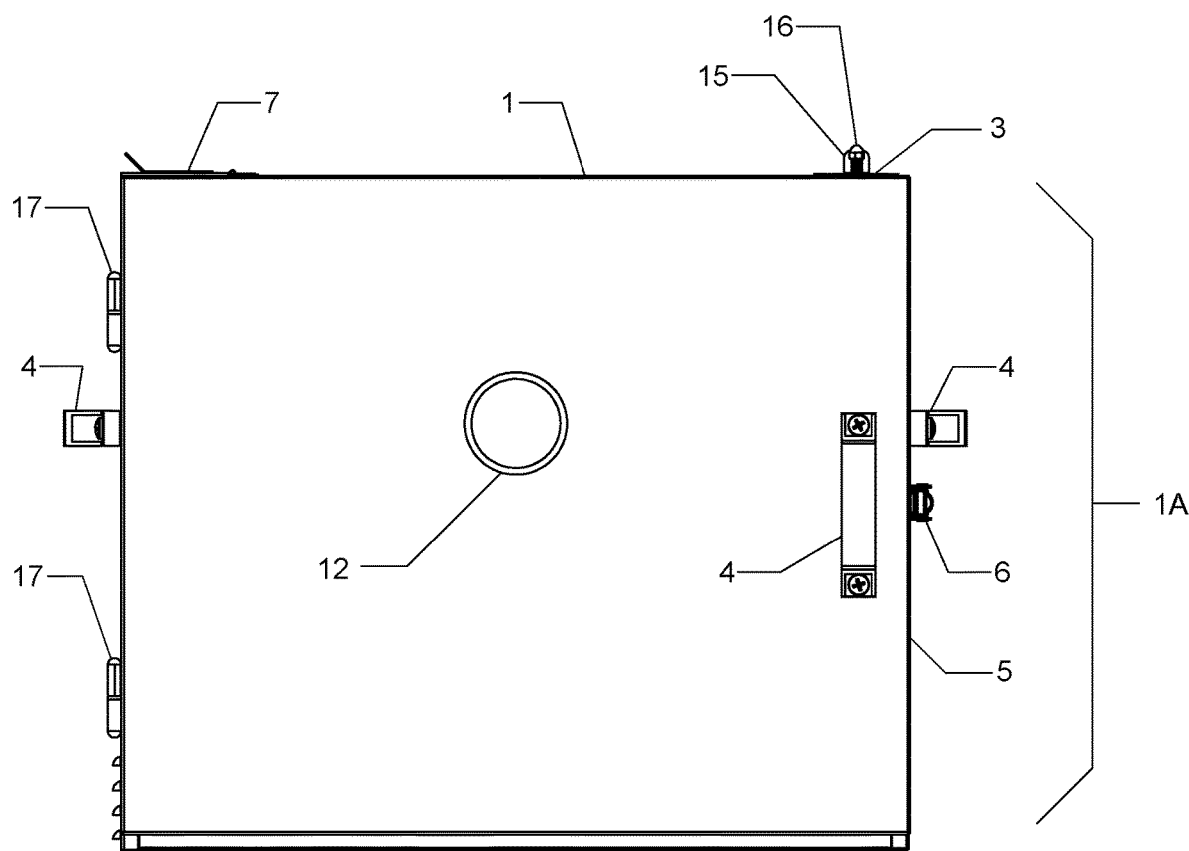
FIG. 3 is a front view of the smoker device with the front door closed.
Figure 4:
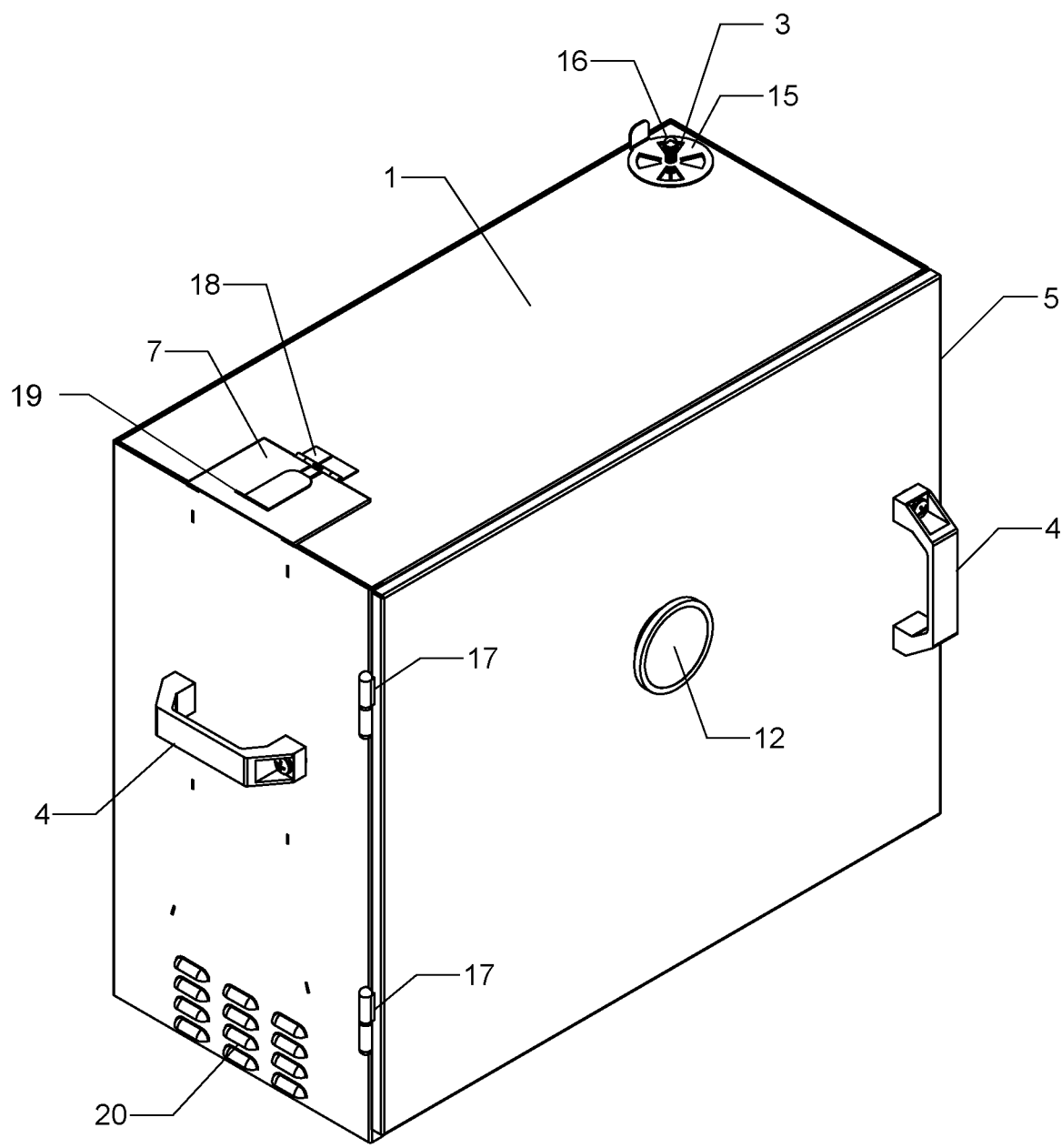
FIG. 4 is a top perspective view of the smoker device with the front door closed.

FIG. 3 and FIG. 4 depict a front view and front perspective view, respectively, of the smoker device 1 with the door 5 closed. Door 5 is supported by, and operates with, two conventional hinges 17 and an adjustable latch 6 to maintain a sealed enclosure. A temperature gauge 12 is installed in the center of the front door 5. Temperature gauge 12 may include different types of temperature sensors, such as, but not limited to, those employing light emitting diode (LED) or other digital readouts.

FIG. 3 and FIG. 4 also portray handles 4 installed on the outside of first side 110 and second side 115, along with door 5. All three (3) handles depicted in FIG. 3 and FIG. 4 are made of thermo-resistant materials (e.g., metal, fiber glass plastic, and delrin) to protect users from personal injury via contact burn while the unit is mounted to, and maneuvered on, an ignited barbecue grill. Each handle depicted in FIG. 3 and FIG. 4 is connected by fasteners to the smoker device 1 for safe handling of the device.

FIG. 3 and FIG. 4 also show an adjustable air damper 3, which is comprised of conventional vents 15 and a spring-loaded nut tensioner 16, that allows the damper to be selectively-pivoted and set to a user's desired preference. Air damper 3 may be of radial configuration. FIG. 3 and FIG. 4 also portray hatch door 7, which may include a spring-loaded hinge 18 with a fixed tab 19 to open and close the door. The spring-loaded hinge 18 applies pressure to hatch door 7 ensuring that hatch door 7 remains closed and fully sealed while the smoker device is functioning. Hatch door 7 may include a folded frame configuration similar to that of door 5, so that, if unwanted gaps or small exit points present themselves, users may install a flame-retardant gasket around hatch door 7 to further seal and enclose the smoking chamber. Hatch door 7 and its components, spring-loaded hinge 18 and fixed tab 19, are preferably built out of hard metals, such as, but not limited to, stainless steel, carbon steel or aluminum.

FIG. 5 displays a close-up top perspective view of chimney box 8 and chimney guide 21, both of which preferably include perforations as shown. Chimney box 8 is preferably a hollow structure perforated in its entirety to allow smoke to emanate throughout the interior chamber 100 of smoker device 1. Chimney top 140 abuts an interior portion of top side 105, with a first chimney side 145 abutting an interior portion of second side 115. First chimney side 145 may be open. Chimney guide 21 begins at hatch 7a, hingeably covered by hatch door 7, and ends in sections that are angled outward to allow wood chips or wood pellets to fall and collect into chip box 11 that rests beneath chimney guide 21. Herein, chimney box 8 tapers in cross-section from narrow at chimney top 140, to wider at the bottom of the chimney box 8, where chip box 11 is positioned. Chip box 11 has a perforated bottom and one perforated wall 22, which allows chip box 11 to expose chips 1 to heat that emanates from cooking unit 2, as depicted in FIG. 1 and FIG. 2.

The perforated side wall 22 of chip box 11 rests adjacent to at least one external vent (20 depicted in FIG. 4) on second side 115 to increase the amount of oxygen and air flow entering the chip box 11 through the process of natural intake venting. The vent 20 may be of a louvered type as shown, or may be a radial type vent, or any other type of vent that allows ambient air to enter the chip box 11. At least one louver 20 is positioned on the second side 115, aligned with chip box 11, chip box 11 including perforations to its side that faces the at least one louver 20, and perforations on its bottom. Chip box 11 does not have a top so that it may receive chips 130 from the chimney guide 21. Chip box 11 may also contain a handle 11 (depicted in FIG. 2) on its interior side wall so that users may safely remove and detach it from the chimney box 8 for removing ashes and other cleaning. Chimney box 8, chimney guide 21, and chip box 11 are preferably all built out of hard metals, such as, but not limited to, stainless steel, carbon steel or aluminum.

Smoker device 1 may also be used in a cold-smoking arrangement, where chips 130 in chip box 11 are ignited by an outside flame source such as a match or lighter. Food placed in interior chamber 100 may then be smoked without the use of heat from cooking unit 2.

Although the present device has been described with respect to one or more embodiments, it will be understood that other embodiments of the present invention may be made without departing from the spirit and scope of the present invention. Hence, the present invention is deemed limited only by the appended claims and the reasonable interpretation thereof.

I claim:

1. A smoker device, comprising:
    a smoker box having a top side, a first side, a second side, and a back side which are all substantially solid;
    a door hingeably mounted to either the first side or the second side, forming a front side of the smoker box;
    an interior chamber formed by the top side, the first side, the second side, the back side, and the front side, the bottom of said interior chamber being open;
    a perforated chimney box with a first chimney side abutting an interior portion of the second side, a chimney box bottom, a chimney box top abutting an interior portion of the top side, and a hatch with a hatch door positioned at the chimney box top;
    a removable open-top chip box positioned at the chimney box bottom, capable of receiving chips which are fed into the hatch;
    and at least one vent positioned on the second side, aligned with the chip box, the chip box including perforations on a side of the chip box that faces the at least one vent and on its bottom.

2. The device of claim 1, in which the smoker box is positioned with the open bottom over a cooking unit, the cooking unit including a heat source, a grill surface supporting the first side, the second side, the back side; the heat source causing chip smoke from chips in the chip box, the chip smoke entering the interior chamber and flavoring food positioned in the interior chamber.

3. The device of claim 2, in which food positioned in the interior chamber is simultaneously flavored by the chip smoke and cooked by the heat source.

4. The device of claim 1, in which the perforated chimney box tapers in cross-section from narrow at the chimney box top to wider at the chimney box bottom.

5. The device of claim 1, in which there is at least one horizontal food rack positioned in the interior chamber.

6. The device of claim 1, in which there is at least one vessel for liquid positioned in the interior chamber.

7. The device of claim 1, in which there is a gasket on the hinged door's interior perimeter.

8. The device of claim 2, in which the dimensions of the smoker box allow it to be supported on the cooking unit's grill surface without removal of the cooking unit's lid.

9. The device of claim 1, the which the chips are capable of being ignited and producing chip smoke, the chip smoke capable of entering the interior chamber and flavoring food positioned in the interior chamber, without the use of the cooking unit's heat source.

10. The device of claim 1 in which an air damper in included on the smoker box.

11. The device of claim 1, in which the smoker box has dimensions 23.25 inches in width, 20.00 inches in height, and 11.25 inches in depth.

* * * * *